United States Patent
Lee et al.

(10) Patent No.: US 9,376,105 B2
(45) Date of Patent: Jun. 28, 2016

(54) APPARATUS AND METHOD FOR CONTROLLING ENGINE CLUTCH OF HYBRID ELECTRIC VEHICLE

(71) Applicant: Hyundai Motor Company, Seoul (KR)

(72) Inventors: Soo Bang Lee, Suwon-si (KR); Kwon Chae Chung, Seoul (KR); Seong Ik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/466,757

(22) Filed: Aug. 22, 2014

(65) Prior Publication Data
US 2015/0166052 A1 Jun. 18, 2015

(30) Foreign Application Priority Data
Dec. 16, 2013 (KR) .................. 10-2013-0156677

(51) Int. Cl.
*B60W 20/00* (2006.01)
*F16D 48/06* (2006.01)
*B60W 10/02* (2006.01)

(52) U.S. Cl.
CPC .............. *B60W 20/40* (2013.01); *B60W 10/02* (2013.01); *F16D 48/066* (2013.01); *B60W 2540/10* (2013.01); *B60W 2710/023* (2013.01); *Y10S 903/946* (2013.01)

(58) Field of Classification Search
CPC ... B60W 20/10; B60W 20/102; B60W 10/02; B60W 10/10; F16D 48/066; Y10S 903/946
See application file for complete search history.

(56) References Cited

U.S. PATENT DOCUMENTS

| 2012/0103709 A1* | 5/2012 | Mochiyama | F16H 61/0031 180/65.21 |
| 2014/0221152 A1* | 8/2014 | Tsutsumi | B60W 20/40 477/5 |
| 2015/0283997 A1* | 10/2015 | Wang | B60W 10/06 701/22 |

FOREIGN PATENT DOCUMENTS

| JP | 2012-86675 A | 5/2012 |
| KR | 10-2010-0091512 A | 8/2010 |

* cited by examiner

*Primary Examiner* — James Trammell
*Assistant Examiner* — Adam Mott
(74) *Attorney, Agent, or Firm* — Morgan, Lewis & Bockius LLP

(57) ABSTRACT

An apparatus and a method for controlling an engine clutch of a hybrid electric vehicle may include a driving information detector to detect demand information for driving and state information of the hybrid electric vehicle, an engine clutch selectively connecting an engine and a motor generating power, and a controller receiving information from the driving information detector and changing a driving mode of the hybrid electric vehicle by controlling an operation of the engine clutch, in which the controller controls standby hydraulic pressure of the engine clutch differently according to a mode changing condition when the driving mode of the hybrid electric is changed from an Electric Vehicle (EV) mode to a Hybrid Electric Vehicle (HEV) mode.

15 Claims, 2 Drawing Sheets

APPARATUS AND METHOD FOR CONTROLLING ENGINE CLUTCH OF HYBRID ELECTRIC VEHICLE

CROSS-REFERENCE TO RELATED APPLICATION

The present application claims priority to Korean Patent Application No. 10-2013-0156677 filed Dec. 16, 2013, the entire contents of which is incorporated herein for all purposes by this reference.

BACKGROUND OF THE INVENTION

1. Field of the Invention

The present invention relates to an apparatus and a method for controlling an engine clutch of a hybrid electric vehicle. More particularly, the present invention relates to an apparatus and a method for controlling an engine clutch of a hybrid electric vehicle that controls a standby hydraulic pressure of an engine clutch differently according to a mode changing condition when the driving mode of the hybrid electric vehicle is changed from an electric vehicle (EV) mode to a hybrid electric vehicle (HEV) mode.

2. Description of Related Art

As is well known, according to demands for improving fuel efficiency for a vehicle and stronger on board diagnosis regulations for exhaust gas, an environmentally-friendly vehicle has been provided.

The environmentally-friendly vehicle generally includes a fuel cell vehicle, an electric vehicle, a plug-in electric vehicle, and a hybrid electric vehicle, and includes one or more motors and engines.

The hybrid electric vehicle can be classified as two types depending on the power source of the engine and the motor. A parallel type of hybrid electric vehicle is driven by mechanical power of the engine directly and uses electric power of the motor in case of need. On the other hand, a straight type of hybrid electric vehicle is driven by electric power of the motor which is converted from mechanical power of the engine by a generator.

The hybrid electric vehicle may be driven in a driving mode such as an electric vehicle (EV) mode which is a true electric vehicle mode using only power of the motor, a hybrid vehicle (HEV) mode which uses rotational force of the engine as main power and uses rotational force of the motor as auxiliary power, and a regenerative braking (RB) mode for collecting braking and inertial energy during driving by braking or inertia of the vehicle through electric generation of the motor to charge the battery.

Herein, the hybrid electric vehicle changes the driving mode from the EV mode to the HEV mode by coupling an engine clutch after the engine starts according to a demand torque of a driver, a battery state of charge, and so on.

The engine clutch transmits power between the engine and the motor, and is coupled by increasing a standby hydraulic pressure to a lockup hydraulic pressure after the engine starts and an engine speed and a motor speed are synchronized.

However, the standby hydraulic pressure generated at the engine clutch is different due to hardware deviations of the engine clutch and a solenoid valve. Thus, when the standby hydraulic pressure is not controlled equally, drivability of the hybrid electric vehicle may be deteriorated according to a lack of starting power when the driving mode changes from the EV mode to the HEV mode.

The conventional art controls the standby hydraulic pressure to about 0.2 bars lower than a practical hydraulic pressure for solving hardware deviations of the engine clutch and the solenoid valve.

However, the practical hydraulic pressure cannot be estimated because of hydraulic pressure reactivity while an engine clutch is being coupled.

Therefore, responsiveness for a kick-down request cannot be secured because of hydraulic pressure reactivity when the engine clutch is coupled according to a kick-down request during the EV mode.

Moreover, the engine clutch is coupled after synchronizing the engine speed and the motor speed, so the responsiveness is delayed according to a delay of hydraulic pressure reactivity when a demand torque of the driver is high.

The information disclosed in this Background of the Invention section is only for enhancement of understanding of the general background of the invention and should not be taken as an acknowledgement or any form of suggestion that this information forms the prior art that is already known to a person skilled in the art.

BRIEF SUMMARY

Various aspects of the present invention are directed to providing an apparatus and a method for controlling an engine clutch of a hybrid electric vehicle having advantages of controlling a standby hydraulic pressure of an engine clutch differently according to a mode changing condition for improving drivability of the hybrid electric vehicle when the driving mode is changed from an electric vehicle (EV) mode to a hybrid electric vehicle (HEV) mode.

In addition, various aspects of the present invention are directed to providing an apparatus and a method for controlling an engine clutch of a hybrid electric vehicle having advantages of controlling a standby hydraulic pressure of an engine clutch differently according to a demand torque of a driver and gradients of an engine speed and a motor speed for improving responsiveness of the hybrid electric vehicle by shortening a coupling time of the engine clutch.

In an aspect of the present invention, an apparatus for controlling an engine clutch of a hybrid electric vehicle may include a driving information detector to detect demand information for driving and state information of the hybrid electric vehicle, the engine clutch selectively connecting an engine and a motor generating power, and a controller receiving information from the driving information detector and changing a driving mode of the hybrid electric vehicle by controlling an operation of the engine clutch, wherein the controller controls a standby hydraulic pressure of the engine clutch differently according to a mode changing condition when the driving mode of the hybrid electric vehicle is changed from an Electric Vehicle (EV) mode to a Hybrid Electric Vehicle (HEV) mode.

The controller controls the standby hydraulic pressure of the engine clutch differently according to gradients of an engine speed and a motor speed when the driving mode of the hybrid electric vehicle is changed from the EV mode to the HEV mode.

The controller controls the standby hydraulic pressure of the engine clutch as a second flow rate when a demand torque of a driver is greater than or equal to a predetermined torque and gradients of the engine speed and the motor speed are greater than or equal to a predetermined gradient, wherein the controller controls the standby hydraulic pressure of the engine clutch as a first flow rate when the demand torque of the driver is less than the predetermined torque or gradients of the engine speed and the motor speed are less than the predetermined gradient when the driving mode of the hybrid electric vehicle is changed from the EV mode to the HEV mode.

The controller controls the standby hydraulic pressure of the engine clutch as a second flow rate when fast responsiveness is requested in the mode changing condition.

The controller controls the standby hydraulic pressure of the engine clutch as a second flow rate when a kick-down is requested in the mode changing condition.

The controller controls the standby hydraulic pressure of the engine clutch as a first flow rate when a battery needs to be charged in the mode changing condition.

The controller controls the standby hydraulic pressure of the engine clutch as a first flow rate when general starting of the hybrid electric vehicle is requested in the mode changing condition.

In another aspect of the present invention, a method for controlling an engine clutch of a hybrid electric vehicle, may include determining by a controller whether a driving mode of the hybrid electric vehicle needs to change from an Electric Vehicle (EV) mode to a Hybrid Electric Vehicle (HEV) mode based on a detected driving information, determining a mode changing condition by the controller according to a demand torque of a driver and gradients of an engine speed and a motor speed when the driving mode of the hybrid electric vehicle needs to change to the HEV mode, and controlling a standby hydraulic pressure of the engine clutch differently according to the mode changing condition by the controller.

The standby hydraulic pressure of the engine clutch is controlled as a second flow rate when the demand torque of the driver is greater than or equal to a predetermined torque and the gradients of the engine speed and the motor speed are greater than or equal to a predetermined gradient.

The standby hydraulic pressure of the engine clutch is controlled as a first flow rate when the demand torque of the driver is less than a predetermined torque, or the gradients of the engine speed and the motor speed are less than a predetermined gradient.

The standby hydraulic pressure of the engine clutch is controlled as a second flow rate when the mode changing condition requests fast responsiveness.

The standby hydraulic pressure of the engine clutch is controlled as a second flow rate when the mode changing condition requests a kick-down.

The standby hydraulic pressure of the engine clutch is controlled as a first flow rate when the mode changing condition requests charging of a battery.

The standby hydraulic pressure of the engine clutch is controlled as a first flow rate when the mode changing condition requests general starting of the hybrid electric vehicle.

In further another aspect of the present invention, a method for controlling an engine clutch of a hybrid electric vehicle, may include determining by a controller whether a driving mode of the hybrid electric vehicle needs to change from an Electric Vehicle (EV) mode to a Hybrid Electric Vehicle (HEV) mode, detecting by the controller a demand torque of a driver and gradients of an engine speed and a motor speed when the driving mode of the hybrid electric vehicle needs to change to the HEV mode, controlling by the controller a standby hydraulic pressure of the engine clutch as a second flow rate when the demand torque of the driver is greater than or equal to a predetermined torque and the gradients of the engine speed and the motor speed are greater than or equal to a predetermined gradient, and controlling the standby hydraulic pressure of the engine clutch as a first flow rate when the demand torque of the driver is less than the predetermined torque or the gradients of the engine speed and the motor speed are less than the predetermined gradient.

As described above, according to the exemplary embodiment of the present invention, the responsiveness of the hybrid electric vehicle can be improved by shortening a coupling time of the engine clutch when the driving mode of the hybrid electric vehicle changes from the EV mode to the HEV mode even though the demand torque of the driver is high.

In addition, the drivability of the hybrid electric vehicle can be improved by securing hydraulic pressure reactivity when the engine clutch is coupled.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
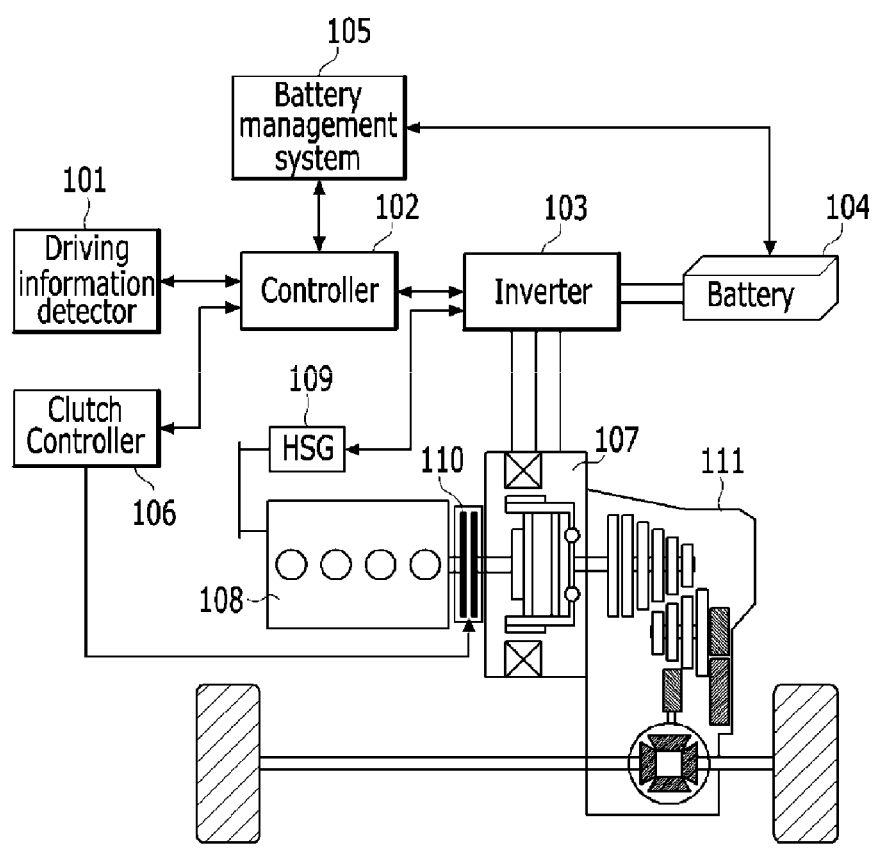
FIG. 1 is a schematic block diagram illustrating an apparatus for controlling an engine clutch of a hybrid electric vehicle according to an exemplary embodiment of the present invention.

Reference numerals set forth in the Drawings include reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

In this specification, unless explicitly described to the contrary, the word "comprise" and variations such as "comprises" or "comprising" will be understood to imply the inclusion of stated elements but not the exclusion of any other elements.

Parts unrelated to the description of the exemplary embodiments are not shown to make the description clear, and like reference numerals designate like element throughout the specification.

The configurations are optionally shown in the drawings for the convenience of description, and the present invention is not limited to the drawings.

FIG. 1 is a schematic block diagram illustrating an apparatus for controlling an engine clutch of a hybrid electric vehicle according to an exemplary embodiment of the present invention.

As shown in FIG. 1, an apparatus for controlling an engine clutch of a hybrid electric vehicle according to an exemplary embodiment of the present invention includes a driving information detector 101, a controller 102, an inverter 103, a battery 104, a battery management system 105, a clutch controller 106, a motor 107, an engine 108, a hybrid starter and generator (HSG) 109, an engine clutch 110, and a transmission 111.

The driving information detector 101 detects the overall driving information including the vehicle speed, the shift gear, the displacement of the accelerator pedal, and the displacement of the brake pedal while a hybrid vehicle travels, and provides the information to the controller 102.

The controller 102 receives a demand torque of a driver from the driving information detector 101 and a state of charge (SOC) of the battery 104 from the battery management system 105, starts the engine 108 when a driving mode needs to change to a HEV mode, and couples the engine clutch disposed between the engine 108 and the motor 107 by using the clutch controller 106.

The controller 102 may perform a method for controlling an engine clutch of a hybrid electric vehicle according to an exemplary embodiment of the present invention to be described below through cooperative control between many controllers provided in the hybrid vehicle.

For example, a hybrid control unit (HCU) as a top controller, an engine control unit (ECU) controlling the entire engine operation, a motor control unit (MCU) controlling the entire operation of the driving motor, a transmission control unit (TCU) controlling the transmission, and the like may be used.

Accordingly, for convenience of description, in this specification and claims, many controllers provided in the hybrid vehicle are commonly called the controller 102.

The controller 102 may control a standby hydraulic pressure of the engine clutch 110 differently according to a mode changing condition when the driving mode of the hybrid electric vehicle is changed from the EV mode to the HEV mode.

Particularly, the controller 102 may control the standby hydraulic pressure of the engine clutch 110 differently according to gradients of an engine speed and a motor speed when the driving mode of the hybrid electric vehicle is changed from the EV mode to the HEV mode.

The controller 102 may control the standby hydraulic pressure of the engine clutch 110 as a second flow rate when a demand torque of the driver is greater than or equal to a predetermined torque and gradients of the engine speed and the motor speed are greater than or equal to a predetermined gradient when the driving mode of the hybrid electric vehicle is changed from the EV mode to the HEV mode. On the other hand, the controller 102 may control the standby hydraulic pressure of the engine clutch 110 as a first flow rate when the demand torque of the driver is less than the predetermined torque or gradients of the engine speed and the motor speed are less than the predetermined gradient.

In addition, the controller 102 may control the standby hydraulic pressure of the engine clutch 110 as the second flow rate when fast responsiveness or a kick-down is requested in the mode changing condition.

On the contrary, the controller 102 may control the standby hydraulic pressure of the engine clutch 110 as the first flow rate when the battery 104 needs to charge or general starting of the hybrid electric vehicle is requested in the mode changing condition.

The first flow rate may be set as a general standby flow rate of the hybrid electric vehicle, and the second flow rate may be set as a standby flow rate that is greater (higher hydraulic pressure) than the first flow rate.

The controller 102 controls the standby hydraulic pressure of the engine clutch 110 differently according to a mode changing condition, generates a slip of the engine clutch 110, and prepares coupling of the engine clutch 110. After that, the controller 102 couples the engine clutch 110 fully when the engine speed and motor speed are synchronized, so the driving mode of the hybrid electric vehicle is changed from the EV mode to the HEV mode.

The inverter 103 is composed of a plurality of power switching elements and drives the motor 107 by converting the DC voltage supplied from the battery 104 into a 3-phase alternating voltage in response to a control signal from the controller 102.

The power switching elements of the inverter 103 may each be implemented by any one of an IGBT (insulated gate bipolar transistor), a Metal-Oxide-Semiconductor Field-Effect Transistor (MOSFET), a transistor, and a relay.

The inverter 103 includes a protection circuit and the protection circuit monitors the flow of power, and when an overvoltage or an overcurrent flows into the power due to various reasons such as a rear-end collision or a collision and exposure to thunder, the protection circuit protects all systems in a hybrid vehicle and keeps the passengers safe from high voltage.

The battery 104 is composed of a plurality of unit cells and stores a high voltage for supplying a voltage to the motor 107, for example, 400 V or 450 V DC.

The battery management system 105 manages the SOC by detecting the current, voltage, and temperature of the cells in an operation range and prevents reduction of lifespan due to overdischarge under a critical voltage or overcharge over the critical voltage, by controlling the charge/discharge voltage of the battery 104.

The clutch controller 106 controls a desired shift gear by controlling an actuator in the transmission 111 in response to a control signal supplied through a network from the controller 102, and allows traveling in the EV mode and the HEV mode by engaging and disengaging the engine clutch 110, by controlling the pressure of the fluid supplied to the engine clutch 110.

The motor 107 is operated by the 3-phase AC voltage applied form the inverter 103 to generate torque, and operates as a power generator and supplies regenerative energy to the battery 104 in a coast down mode.

The engine 108 outputs power as a power source while turning on.

The HSG 109 operates as a starter and a generator, starts the engine 108 in response to a control signal to the controller 102 from the hybrid vehicle, and generates power by operating as a generator and supplies the generated power as a charge voltage to the battery 104 through the inverter 103, when the engine 108 keeps operating.

The engine clutch 110 is disposed between the engine 108 and the motor 107 so that it provides the EV mode and the HEV mode.

The transmission 111 is an automatic transmission or a CVT and shifts to a desired gear by operating engagement elements and disengagement elements, using hydraulic pressure by control of the clutch controller 106.

The operation of controlling an engine clutch in a hybrid vehicle according to the present invention having the configuration including the function described above is achieved as follows.

Figure 2:
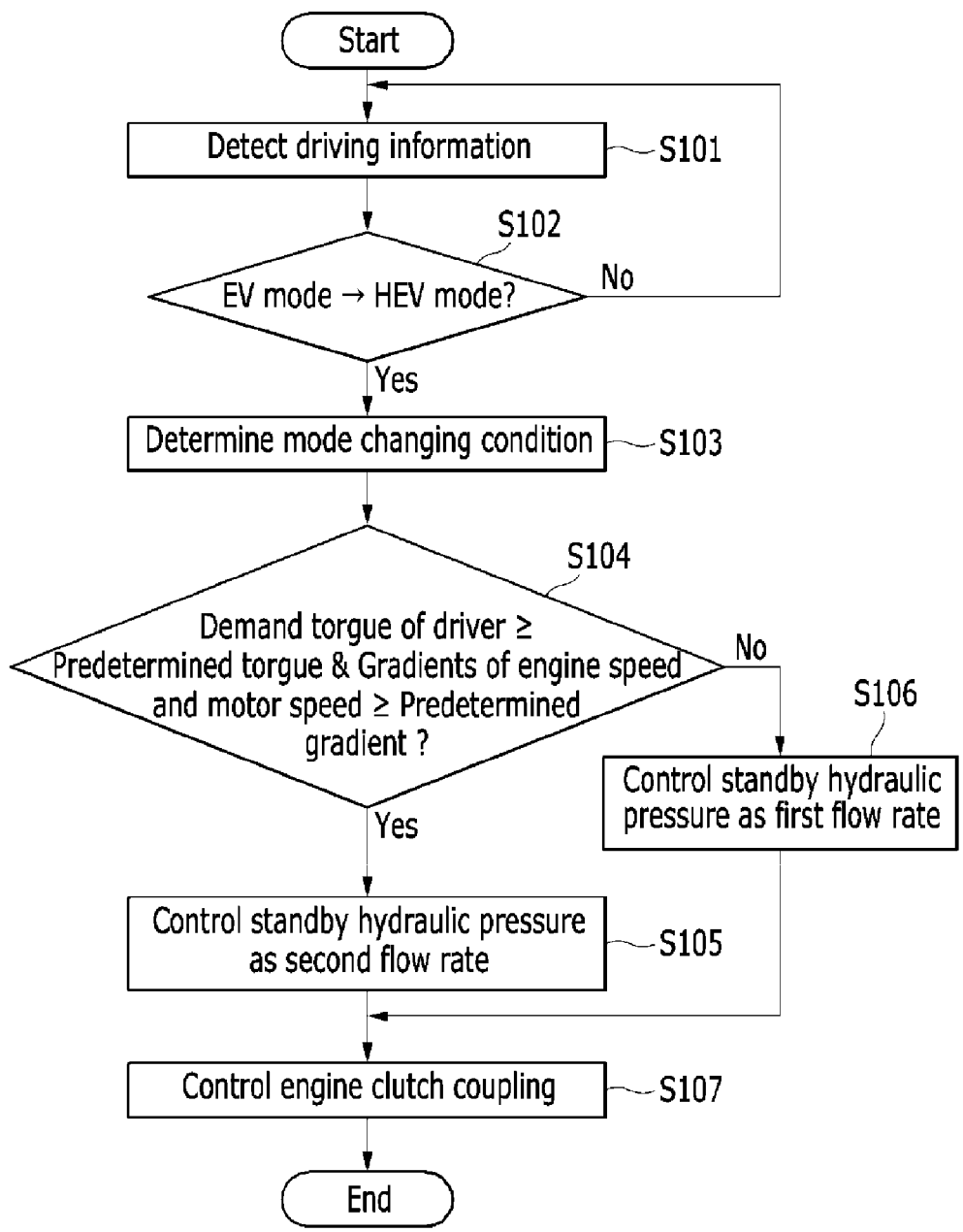
FIG. 2 is a flowchart illustrating a method for controlling an engine clutch of a hybrid electric vehicle according to an exemplary embodiment of the present invention.

FIG. 2 is a flowchart illustrating a method for controlling an engine clutch of a hybrid electric vehicle according an exemplary embodiment of the present invention.

As illustrated in FIG. 2, the method for controlling an engine clutch of a hybrid electric vehicle according to an exemplary embodiment of the present invention starts when the driving information detector 101 detects demand information for driving and state information of the hybrid electric vehicle at step S101.

The controller 102 receives the driving information detected at the step S101 and determines that the driving mode of the hybrid electric vehicle needs to change from the EV mode to the HEV mode at step S102.

When the driving mode of the hybrid electric vehicle needs to change to the HEV mode at the step S102, the controller 102 determines a mode changing condition at step S103.

In this regard, the controller 102 may start the engine 108 by operating the HSG 109 as a starter in order to change the driving mode of the hybrid electric vehicle to the HEV mode.

In addition, the controller 102 may determine the mode changing condition in which fast responsiveness, a kickdown, general starting, or battery charging is requested.

That is, the controller 102 determines that a demand torque of the driver is greater than or equal to a predetermined torque and gradients of an engine speed and a motor speed are greater than or equal to a predetermined gradient at step S104.

When the demand torque of the driver is greater than or equal to a predetermined torque and gradients of the engine speed and the motor speed are greater than or equal to a predetermined gradient at the step S104, the controller 102 controls a standby hydraulic pressure of the engine clutch 110 as a second flow rate at step S105.

On the other hand, when the demand torque of the driver is less than the predetermined torque or gradients of the engine speed and the motor speed are less than the predetermined gradient at the step S104, the controller 102 controls the standby hydraulic pressure of the engine clutch 110 as a first flow rate at step S106.

That is, the controller 102 may control the standby hydraulic pressure of the engine clutch 110 differently according to a mode changing condition when the driving mode of the hybrid electric is changed from the EV mode to the HEV mode, so reactivity about coupling of the engine clutch 110 can be improved.

After that, the controller 102 controls the standby hydraulic pressure of the engine clutch 110 as the second flow rate or the first flow rate according to the mode changing condition, and controls coupling of the engine clutch 110 at step S107.

In the step S107, the coupling of the engine clutch 110 may couple the engine clutch 110 fully while synchronizing the engine speed and the motor speed after the engine clutch 110 is slipped.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling an engine clutch of a hybrid electric vehicle, comprising:
    a driving information detector to detect demand information for driving and state information of the hybrid electric vehicle;
    the engine clutch selectively connecting an engine and a motor generating power; and
    a controller receiving information from the driving information detector and changing a driving mode of the hybrid electric vehicle by controlling an operation of the engine clutch,
    wherein the controller controls a standby hydraulic pressure of the engine clutch differently according to a mode changing condition when the driving mode of the hybrid electric vehicle is changed from an Electric Vehicle (EV) mode to a Hybrid Electric Vehicle (HEV) mode, and
    wherein the controller controls the standby hydraulic pressure of the engine clutch differently according to gradients of an engine speed and a motor speed when the driving mode of the hybrid electric vehicle is changed from the EV mode to the HEV mode.

2. The apparatus of claim 1,
    wherein the controller controls the standby hydraulic pressure of the engine clutch as a second flow rate when a demand torque of a driver is greater than or equal to a predetermined torque and the gradients of the engine speed and the motor speed are greater than or equal to a predetermined gradient, and
    wherein the controller controls the standby hydraulic pressure of the engine clutch as a first flow rate when the demand torque of the driver is less than the predetermined torque or gradients of the engine speed and the motor speed are less than the predetermined gradient when the driving mode of the hybrid electric vehicle is changed from the EV mode to the HEV mode.

3. The apparatus of claim 1, wherein the controller controls the standby hydraulic pressure of the engine clutch as a second flow rate when fast responsiveness is requested in the mode changing condition.

4. The apparatus of claim 1, wherein the controller controls the standby hydraulic pressure of the engine clutch as a second flow rate when a kick-down is requested in the mode changing condition.

5. The apparatus of claim 1, wherein the controller controls the standby hydraulic pressure of the engine clutch as a first flow rate when a battery needs to be charged in the mode changing condition.

6. The apparatus of claim 1, wherein the controller controls the standby hydraulic pressure of the engine clutch as a first flow rate when general starting of the hybrid electric vehicle is requested in the mode changing condition.

7. A method for controlling an engine clutch of a hybrid electric vehicle, comprising:
   determining by a controller whether a driving mode of the hybrid electric vehicle needs to change from an Electric Vehicle (EV) mode to a Hybrid Electric Vehicle (HEV) mode based on a detected driving information;
   determining a mode changing condition by the controller according to a demand torque of a driver and gradients of an engine speed and a motor speed when the driving mode of the hybrid electric vehicle needs to change to the HEV mode; and
   controlling a standby hydraulic pressure of the engine clutch differently according to the mode changing condition by the controller.

8. The method of claim 7, wherein the standby hydraulic pressure of the engine clutch is controlled as a second flow rate when the demand torque of the driver is greater than or equal to a predetermined torque and the gradients of the engine speed and the motor speed are greater than or equal to a predetermined gradient.

9. The method of claim 7, wherein the standby hydraulic pressure of the engine clutch is controlled as a first flow rate when the demand torque of the driver is less than a predetermined torque, or the gradients of the engine speed and the motor speed are less than a predetermined gradient.

10. The method of claim 7, wherein the standby hydraulic pressure of the engine clutch is controlled as a second flow rate when the mode changing condition requests fast responsiveness.

11. The method of claim 7, wherein the standby hydraulic pressure of the engine clutch is controlled as a second flow rate when the mode changing condition requests a kick-down.

12. The method of claim 7, wherein the standby hydraulic pressure of the engine clutch is controlled as a first flow rate when the mode changing condition requests charging of a battery.

13. The method of claim 7, wherein the standby hydraulic pressure of the engine clutch is controlled as a first flow rate when the mode changing condition requests general starting of the hybrid electric vehicle.

14. A method for controlling an engine clutch of a hybrid electric vehicle, comprising:
   determining by a controller whether a driving mode of the hybrid electric vehicle needs to change from an Electric Vehicle (EV) mode to a Hybrid Electric Vehicle (HEV) mode;
   detecting by the controller a demand torque of a driver and gradients of an engine speed and a motor speed when the driving mode of the hybrid electric vehicle needs to change to the HEV mode;
   controlling by the controller a standby hydraulic pressure of the engine clutch as a second flow rate when the demand torque of the driver is greater than or equal to a predetermined torque and the gradients of the engine speed and the motor speed are greater than or equal to a predetermined gradient; and
   controlling the standby hydraulic pressure of the engine clutch as a first flow rate when the demand torque of the driver is less than the predetermined torque or the gradients of the engine speed and the motor speed are less than the predetermined gradient.

15. An apparatus for controlling an engine clutch of a hybrid electric vehicle, comprising:
   a driving information detector to detect demand information for driving and state information of the hybrid electric vehicle;
   the engine clutch selectively connecting an engine and a motor generating power; and
   a controller receiving information from the driving information detector and changing a driving mode of the hybrid electric vehicle by controlling an operation of the engine clutch,
   wherein the controller controls a standby hydraulic pressure of the engine clutch differently according to a mode changing condition when the driving mode of the hybrid electric vehicle is changed from an Electric Vehicle (EV) mode to a Hybrid Electric Vehicle (HEV) mode,
   wherein the controller controls the standby hydraulic pressure of the engine clutch as a second flow rate when a demand torque of a driver is greater than or equal to a predetermined torque and gradients of the engine speed and the motor speed are greater than or equal to a predetermined gradient, and
   wherein the controller controls the standby hydraulic pressure of the engine clutch as a first flow rate when the demand torque of the driver is less than the predetermined torque or gradients of the engine speed and the motor speed are less than the predetermined gradient when the driving mode of the hybrid electric vehicle is changed from the EV mode to the HEV mode.

* * * * *